July 20, 1943.  K. R. HERMAN  2,324,701
FLUID PRESSURE ACCUMULATOR
Filed Dec. 18, 1939
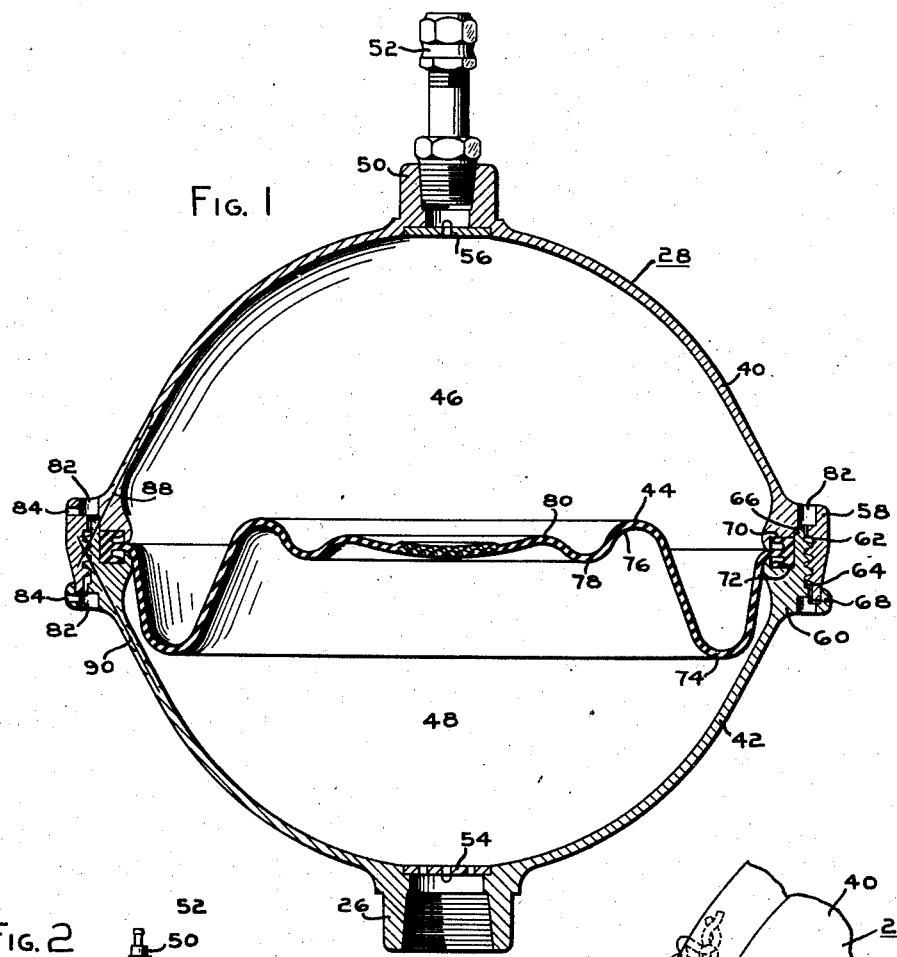
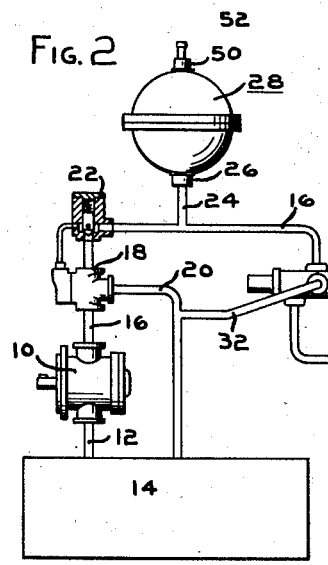
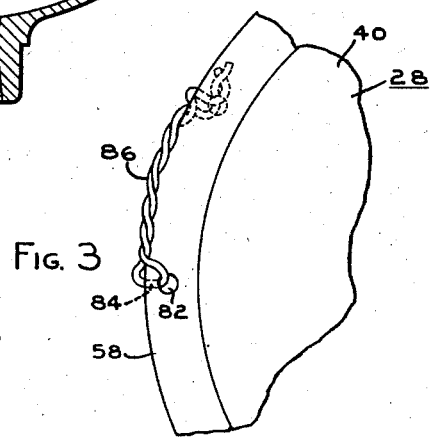
INVENTOR
KENNETH R. HERMAN
BY
ATTORNEY Patented July 20, 1943

2,324,701

UNITED STATES PATENT OFFICE 2,324,701

FLUID PRESSURE ACCUMULATOR

Kenneth Ray Herman, Detroit, Mich., assignor to Vickers Incorporated, Detroit, Mich., a corporation of Michigan Application December 18, 1939, Serial No. 309,735

4 Claims. (Cl. 138—30)

This invention relates to power transmissions and more particularly to those of the type comprising two or more fluid pressure energy translating devices, one of which may function as a pump and another as a fluid motor.

The invention is particularly concerned with an accumulator for use in such power systems and especially adapted for service where light weight and small bulk are of primary importance, for example, aboard aircraft. These systems are usually operated at very high pressures in the accumulator, that is, around 1,000 pounds per square inch or higher, and where the term "high pressure" is used hereafter, pressures of this order are intended. Accumulators for hydraulic power systems are generally of either the air-loaded, spring-loaded or weight-loaded type and consist essentially of a chamber in which a body of liquid of varying volume may be stored together with means for maintaining a constant or nearly constant pressure upon the body of liquid.

The present invention is concerned with air-loaded accumulators and particularly those of the spherical type. It is understood that other elastic fluids may be utilized in place of air and that the term "air" is used as a convenient designation for all such fluids. Since the sphere presents the largest volume per unit of surface of any geometric shape, certain advantages may be gained in the way of weight savings by the use of a spherical accumulator.

With air-loaded types of accumulators and for systems which use oil as the power transmitting liquid, it is also desirable to provide some means for preventing surface contact between the air and the liquid since the air gradually dissolves into the oil over a period of time. One suitable arrangement for providing this separation between the air and oil utilizes a flexible diaphragm of impervious material, and where such a diaphragm is used, it is desirable that the spherical accumulator be formed of two parts, for example, two hemispheres. In constructing an accumulator of this type it would be desirable to screw the two halves of the accumulator shell together by threads formed on each half but such construction has heretofore been impossible to utilize because the pressure forces set up in operation of the accumulator distort the threaded portions causing the two halves to separate. This difficulty could, of course, be avoided by fastening the two halves together with a plurality of bolts or other fastening means spaced circumferentially around the flanged rims of the two halves of the accumulator. Such construction, however, is decidedly bulky and heavy as compared with the integral screw connection.

An object of the present invention, therefore, is to provide a spherical air-loaded accumulator wherein two hemispherical cups are removably joined by internal and external screw threads formed on their rims and wherein the wall portions of the cups join the rims in such a manner that spreading of the threaded portions is prevented.

A further object is to provide an improved diaphragm construction for accumulators of the class described.

Further objects and advantages of the present invention will be apparent from the following description, reference being had to the accompanying drawing wherein a preferred form of the present invention is clearly shown.

In the drawing:

Figure 1 is a cross section of an accumulator embodying a preferred form of the present invention.

Figure 2 is a diagrammatic view of a power transmission system including the accumulator of Figure 1.

Figure 3 is a fragmentary top view of the rim portion of the accumulator shown in Figure 1.

Referring now to Figure 2, there is shown diagrammatically a conventional power transmission system including a pump 10 adapted to be driven from any suitable prime mover, not shown. The pump 10 has a suction conduit 12 through which fluid is withdrawn from a tank 14 and delivered by the pump 10 to a delivery conduit 16. The latter incorporates a pressure-responsive unloading valve 18 which acts to by-pass the full pump delivery to the tank at negligible pressure through a by-pass conduit 20. A check valve 22 is also incorporated in the delivery conduit 16.

Beyond the check valve 22 a branch conduit 24 leads to the liquid connection 26 of an air-loaded accumulator 28. The delivery conduit 16 leads to a conventional four-way reverse valve 30 which also has a tank connection 32. Two other conduits 34 and 36 lead to a fluid motor 38 of conventional construction and which may be connected to drive any suitable load device. The circuit above described is typical of the class of power transmission circuits with which the accumulator of the present invention is particularly adapted for use.

Referring to Figure 1, the accumulator itself is there shown in cross section and includes two generally hemispherical cups 40 and 42 which are joined together to provide a generally spherical closed chamber. Clamped between the two cups is a flexible diaphragm 44 which divides the spherical chamber into an upper air chamber 46 and a lower liquid chamber 48. Suitable connection bosses are provided at 26 and 50, the former providing a liquid connection and the latter providing an air-inlet connection to which a suitable check valve 52 may be connected for initially charging the chamber 46 with air under pressure. Preferably perforated disks 54 and 56 are provided at the inner end of the air and liquid connections so as to prevent undue distortion of the diaphragm 44 should either the liquid chamber or the air chamber become completely empty. These disks may be secured in any suitable manner as by staking them in at their peripheries.

The two cups 40 and 42 are provided with thickened rim portions 58 and 60, the former having an internal screw thread formed at 62 and the latter an external screw thread formed at 64. The rim 58 is also provided with a shoulder at 66 which abuts against the inner edge of the upstanding threaded portion of rim 60. Likewise the rim 60 is provided at its outer periphery with a reentrant flange 68 abutting against the outer edge of the threaded portion of rim 58. Each rim is also provided with an annular recess 70 and 72 which receives the doubly flanged periphery of the diaphragm 44. This periphery is formed as shown in the drawing in a shape somewhat resembling a capital T in cross section, and due to the flexible nature of the material of which the diaphragm 44 is formed, it acts to automatically seal the joint between the two cups 40 and 42 against leakage under any pressure, that is, the higher the pressure, the tighter is the seal that is formed by the flanged portions, being pushed tighter against the upper wall of recess 70 and the lower wall of recess 72.

The diaphragm 44 is preferably formed of a flexible oil-resistant material, for example, synthetic rubber known to the trade as neoprene. The diaphragm is also formed in a peculiar shape comprising a plurality of annular corrugations designated 74, 76, 78 and 80. It will be noted that corrugation 74 is the deepest while corrugation 76 is less deep and so on progressing inwardly toward the center of the diaphragm.

The rims 58 and 60 may be provided with holes 82 suitably spaced around the periphery for the reception of a spanner tool for screwing and unscrewing the cups. One pair of such holes is provided with small cross bores 84 through which a fastening wire 86 may be threaded to prevent accidental loosening of the threaded joint.

In operation of the accumulator, liquid under pressure is stored in the chamber 48 in varying quantities as determined by the difference at any given instant between the volume delivered by pump 10 and the volume consumed by motor 38. Air or other suitable elastic fluid under the same pressure is stored in chamber 46 and acts to maintain pressure on the liquid in chamber 48. This pressure, while not absolutely constant, may nevertheless be sufficient at all times to provide the necessary operating pressure for the motor 38. The volume stored in the liquid chamber 48 serves to augment the pump delivery during periods of high consumption at the motor 38 while the volume is replenished during periods of lower consumption.

When the accumulator becomes filled to a substantial volume of liquid, the rising pressure in both chambers actuates the unloading valve 18 to discontinue further delivery by the pump 10 through the check valve 22 until such time as the supply of liquid in chamber 48 is depleted to the point where the unloading valve 18 again cuts the pump into service.

It will be noted that the walls of the cups 40 and 42 are not truly spherical throughout their full extent but include a portion near the rims 58 and 60 which is conical in shape. The forces set up by fluid pressure in the chambers 46 and 48 tend to separate the two cups 40 and 42 and are transmitted to the rims 58 and 60 along lines of action designated 88 and 90 which are coincident with the section axis of the conical portions of the cup walls. Preferably the angle of these conical portions and the point at which they join the rim portions 58 and 60 are such that the lines of action 88 and 90 intersect at or near the pitch line of the threads 62—64. In this way there is avoided setting up any bending stresses which tend to bend the rim portions 58 in a direction which would open up the internal thread 64, that is, increases its diameter, particularly at the bottom, or any bending stresses in the rim 60 which would tend to shrink the threaded portion 64, particularly at the top. The shoulder 66 and the flange 68 also act to prevent such spreading of the threaded portions, but it has been found in practice that unless the lines of action 88 and 90 are disposed fairly closely to the position disclosed, sufficient bending stresses and strains occur as to prevent disassembly of the two cups after they have once been assembled and subjected to their designed testing pressure. By the use of the present construction, all difficulties of this nature have been avoided and the shoulder 66 and flange 68 serve merely as extra precautionary devices which under normal loads are not subjected to significant stress.

While the form of embodiment of the invention as herein disclosed constitutes a preferred form, it is to be understood that other forms might be adopted, all coming within the scope of the claims which follow.

What is claimed is as follows:

1. An air-loaded accumulator for high pressure hydraulic power systems comprising a pair of generally hemispherical cups joined together to provide a generally spherical closed vessel and having a wall thickness less than 2% of their spherical diameter, and a flexible impervious diaphragm clamped between the cups and dividing the vessel into a liquid chamber and an air chamber, said cups having thickened rims, one with an internal screw thread and the other with an external screw thread, the depth of said thread being of the same order of magnitude as the wall thickness of the cups.

2. An air-loaded accumulator for hydraulic power systems comprising a pair of generally hemispherical thin-walled cups joined together to provide a generally spherical closed vessel, and a flexible impervious diaphragm clamped between the cups and dividing the vessel into a liquid chamber and an air chamber, said cups having thickened rims, one with an internal screw thread and the other with an external screw thread, the walls of said cups joining said rims, when viewed in section, so that their neutral axes intersect each other substantially on the pitch diameter of said threads.

3. An air-loaded accumulator for high pressure hydraulic power systems comprising a pair of generally hemispherical cups joined together to provide a generally spherical closed vessel and having a wall thickness less than 2% of their spherical diameter, a flexible impervious diaphragm clamped between the cups and dividing the vessel into a liquid chamber and an air chamber, said cups having thickened rims, one with an internal screw thread and the other with an external screw thread, said diaphragm having an upstanding peripheral flange portion on both of its faces, and an annular groove formed in each of said cups to receive each of said flange portions.

4. An air-loaded accumulator for hydraulic power systems comprising a pair of generally hemispherical thin-walled cups joined together to provide a generally spherical closed vessel, and a flexible impervious diaphragm clamped between the cups and dividing the vessel into a liquid chamber and an air chamber, said cups having thickened rims, one with an internal screw thread and the other with an external screw thread, said threads having their pitch line when viewed in section passing substantially through the intersection of the neutral axes of the walls extended into the thickened rims.

KENNETH RAY HERMAN.